(12) United States Patent
Yoshimura et al.

(10) Patent No.: US 6,818,735 B2
(45) Date of Patent: Nov. 16, 2004

(54) BATTERY POLYMERIC MATERIAL, BATTERY SEPARATOR, BATTERY INSULATING PACKING, AND LITHIUM BATTERY

(75) Inventors: Seiji Yoshimura, Hirakata (JP); Hiroshi Nakajima, Hirakata (JP); Maruo Kamino, Katano (JP); Nobuhiro Nishiguchi, Sumoto (JP); Masahiro Imanishi, Mihara-gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 426 days.

(21) Appl. No.: 09/934,537

(22) Filed: Aug. 23, 2001

(65) Prior Publication Data

US 2002/0051910 A1 May 2, 2002

(30) Foreign Application Priority Data

Aug. 25, 2000 (JP) ........................................ 2000-255179

(51) Int. Cl.$^7$ .............................................. C08G 65/34
(52) U.S. Cl. .................... 528/425; 528/86; 528/422; 528/125; 429/249; 429/176; 429/247; 429/167
(58) Field of Search .................... 528/425, 86, 125, 528/422; 429/249, 176, 247, 167

(56) References Cited

U.S. PATENT DOCUMENTS

| | | |
|---|---|---|
| 5,003,032 A | 3/1991 | Daniels |
| 6,376,109 B1 | 4/2002 | Sano et al. |

FOREIGN PATENT DOCUMENTS

| | | |
|---|---|---|
| JP | 08-031429 | 2/1996 |
| JP | 2000-040525 | 2/2000 |
| JP | 2000-048859 | 2/2000 |
| JP | 2000-173627 | 6/2000 |
| JP | 2000-251935 | 9/2000 |

OTHER PUBLICATIONS

Watanabe et al; secondary—separators; Seiko Instruments, Inc., Japan, Jul. 2000, Chem Abstract 133:76729.*
Obi, Batteries—for the mounting; Matsushita electric Industrial Co., Ltd, Japan, Apr. 2000, Chem Abstract 132: 253582.*
Takahashi et al; Secondary—batteries; Summitomo Chemical Co., Ltd., Japan, Chem Abstract 132: 253569.*
Tanaka et al; Alkaline battery separators; Japan Vilene Co., Ltd, Japan, Apr. 2000; Chem Abstract 132: 239425.*
Shinohara et al; Separator—electrolyte; Sumitomo Chemical Co., Ltd., Japan; Nov. 1999; Chem Abstract 131: 325079.*
Polymer Handbook, Fourth Edition; J. Brandrup, E.H. Immergut, and E.A. Grulke; John Wiley & Sons, Inc.; p. VI/226 and VIII/10.

* cited by examiner

*Primary Examiner*—Duc Truong
(74) *Attorney, Agent, or Firm*—Westerman, Hattori, Daniels & Adrian, LLP

(57) ABSTRACT

A lithium battery employs for a battery separator and a battery insulating packing and the like a battery polymeric material comprising repeating units wherein p-phenylene is combined with one type of group selected from the group composed of oxygen, a methylene group, an isopropylidene group, a carbonyl group, a carbonyldioxy group, a carboxylic acid anhydride group, an amide group, an ureylene group and a sulfonyl group, or a polymeric material comprising at least two types of repeating units wherein p-phenylene is combined with one type of group selected from the group composed of oxygen, a methylene group, an isopropylidene group, a carbonyl group, a carbonyldioxy group, a carboxylic acid anhydride group, an amide group, an ureylene group, a sulfonyl group, sulfur and a carbonyloxy group.

2 Claims, 1 Drawing Sheet

Fig
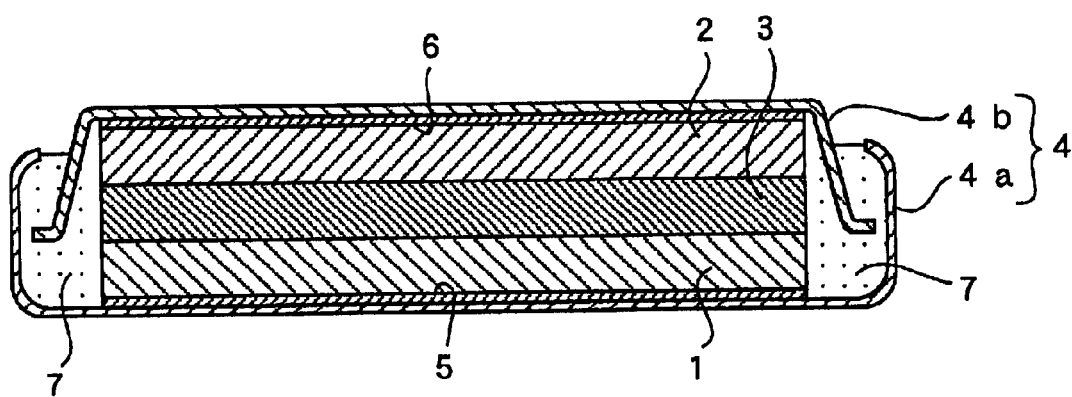

BATTERY POLYMERIC MATERIAL, BATTERY SEPARATOR, BATTERY INSULATING PACKING, AND LITHIUM BATTERY

BACKGROUND OF THE INVENTION

1. Field of the Invention

The present invention relates to a lithium battery provided with a positive electrode, a negative electrode, a non-aqueous electrolyte, and a battery separator separating the above-mentioned positive electrode and negative electrode in a battery case, and battery polymeric materials employed for a battery separator separating the positive electrode and the negative electrode and a battery insulating packing sealing the battery case in a lithium battery. More particularly, the present invention is characterized in that discharge characteristics and the like of a lithium battery are prevented from being degrade even when the lithium battery is exposed to high temperature conditions, such as when the lithium battery is put into a reflowing furnace to be automatically soft-soldered.

2. Description of the Related Art

In recent years, a lithium battery employing a non-aqueous electrolyte to utilize oxidation and reduction of lithium ions have begun to be used as one of new-type lithium batteries having high power and high energy density.

Such a lithium battery employs the non-aqueous electrolyte as described above, and thereby evolution of hydrogen and oxygen due to a positive electrode and a negative electrode reacting during storage is restrained. Therefore, the lithium battery has begun to be used as an electric source for emergency such as for memory-backup and the like.

In the above-mentioned lithium battery, a positive electrode, a negative electrode and a non-aqueous electrolyte are generally contained in a battery case. In the lithium battery as described above, polymeric materials are employed for a battery separator separating the positive electrode and the negative electrode and a battery insulating packing electrically separating the battery case.

Further, in employing the lithium battery as an electric source for emergency such as for memory-backup and the like as described above, it is attempted that the lithium battery is put into a reflowing furnace to automatically soft-solder a lead terminal thereof onto a printed board.

When the lithium battery is put into a reflowing furnace to automatically soft-solder the lead terminal thereof onto the printed board as described above, the lithium battery is exposed to high temperature in the reflowing furnace and is usually kept under the high temperature conditions of 250° C. for about ten seconds.

However, when the lithium battery is kept under high temperature conditions of 250° C. for about ten seconds as described above, there exists a problem that the non-aqueous electrolyte in the battery case of the lithium battery reacts with the above-mentioned battery separator and the battery insulating packing which are formed by polymeric materials, whereby various performances of the lithium battery such as discharge capacity and the like are degraded.

SUMMARY OF THE INVENTION

An object of the present invention is to restrain polymeric materials as a battery separator separating a positive electrode and a negative electrode and a battery insulating packing sealing a battery case from reacting with a non-aqueous electrolyte in order to prevent various performances of a lithium battery such as discharge capacity and the like when the lithium battery is exposed to high temperature conditions such as when the lithium battery is put into a reflowing furnace to be automatically soft-soldered.

The first battery polymeric material according to the present invention employed for the battery separator and the battery insulating packing comprises repeating units wherein p-phenylene is combined with one type of group selected from the group composed of oxygen, a methylene group, an isopropylidene group, a carbonyl group, a carbonyldioxy group, a carboxylic acid anhydride group, an amide group, an ureylene group and a sulfonyl group.

Further, the second battery polymeric material according to the present invention employed for the battery separator and the battery insulating packing in the lithium battery comprises repeating units wherein at least two types of p-phenylene which is combined with one type of group selected from the group composed of oxygen, a methylene group, an isopropylidene group, a carbonyl group, a carbonyldioxy group, a carboxylic acid anhydride group, an amide group, an ureylene group, a sulfonyl group, sulfur and a carbonyloxy group are combined with each other.

Further, when the battery separator and the battery insulating packing in the lithium battery comprises the above-mentioned first and second polymeric materials, in the case where the lithium battery is exposed to the high temperature conditions such as the case where the lithium battery is put into a reflowing furnace to be automatically soft-soldered, the battery separator and the battery insulating packing which are formed by the above-mentioned polymeric materials are restrained from reacting with the non-aqueous electrolyte, and as a result, various performances of the lithium battery such as discharge capacity and the like are prevented from being degraded.

In the above-mentioned first battery polymeric material, it is preferable that the group combined with p-phenylene is composed of oxygen or a carbonyl group. On the other hand, in the above-mentioned second battery polymeric material, it is preferable that the groups combined with p-phenylene are composed of oxygen and a carbonyl group. Further, when the first and second battery polymeric material as described above are employed for the battery separator and the battery insulating packing of the lithium battery, in the case where the lithium battery is exposed to the high temperature conditions, the polymeric materials are further restrained from reacting with the non-aqueous electrolyte, and thereby discharge capacity of the lithium battery is further prevented from being degraded.

Further, the lithium battery according to the present invention is characterized in that the above-mentioned first and second battery polymeric materials are employed for the battery separator and the battery insulating packing of the lithium battery. The type of solvent and solute to be used for the non-aqueous electrolyte of the lithium battery and the type of materials to be used for the positive electrode and the negative electrode and the like are not particularly limited, that is, a solvent, a solute and materials which have been generally used in lithium batteries may be used. Additionally, the lithium battery according to the present invention may be either of a primary battery and a secondary battery.

In the lithium battery according to the present invention, examples of a solute to be used in the non-aqueous electrolyte include a lithium compound such as hexafluorophosphoric acid lithium ($LiPF_6$), tetrafluoroboric acid lithium ($LiBF_4$), trifluoro-methanesulfonic acid lithium ($LiCF_3SO_3$), lithium trifluoro-methanesulfonic acid imide [$LiN(CF_3SO_2)_2$], lithium pentafluoro-ethanesulfonic acid imide [$LiN(C_2F_5SO_2)_2$], lithium trifluoro-ethanesulfonic acid methide [$LiC(CF_3SO_2)_3$], and the like.

Further, as a solvent to be used in the non-aqueous electrolyte, a solvent having a high permittivity such as ethylene carbonate, propylene carbonate, 1.2-buthylene carbonate, vinylene carbonate, γ-butyrolactone, sulfolane, and the like, or a solvent having a low viscosity such as 1.2-dimethoxyethane, 1.2-diethoxyethane, 1.2-etoxymethoxyethane, tetrahydrofuran, 1.3-dioxolane, dimethyl carbonate, diethyl carbonate, ethyl methyl carbonate, and the like may be employed alone or in combination with not less than two types. In particular, when a mixture solvent of the above-mentioned solvent having a high permittivity and a low viscosity is employed, ion conductivity of the non-aqueous electrolyte is increased. Increasingly, when an alloy of lithium and aluminum is employed for the negative electrode, a coating layer excellent in ion conductivity is formed on the negative electrode, whereby discharge characteristics of the lithium battery is improved.

Further, in the lithium battery according to the present invention, examples of a positive electrode material to form the positive electrode include manganese dioxide, vanadium pentoxide, niobium oxide, cobalt-lithium oxide, nickel-lithium oxide and spinal manganese oxide, and the like. In particular, when boron-containing lithium-manganese complex oxide having boron or a boron compound dissolved therein is employed as the positive electrode material, the lithium battery excellent in charge/discharge cycle performance can be obtained.

Further, in the lithium battery according to the present invention, examples of a negative electrode material to form the negative electrode include a lithium alloy such as metal lithium, a lithium-aluminum alloy, a lithium-aluminum-manganese alloy, a lithium-lead alloy, a lithium-tin alloy, a lithium-silicon alloy and the like, graphite capable of occuluding and discharging of lithium ions, coke, a carbon material such as a calcined product of organic substances, and the like. In particular, when a Li—Al alloy is employed as described above, a coating layer excellent in ion conductivity is formed on the negative electrode due to the combination of the Li—Al alloy and a solvent in the non-aqueous electrolyte, whereby lithium batteries excellent in discharge characteristics can be obtained.

These and other objects, advantages and features of the invention will become apparent from the following description thereof taken in conjunction with the accompanying drawings which illustrate specific embodiment of the invention.

BRIEF DESCRIPTION OF THE DRAWINGS

The FIGURE is a schematic explanatory view of internal construction of the lithium battery fabricated in each inventive example and comparative example.

DESCRIPTION OF THE PREFERRED EMBODIMENTS

The following examples specifically illustrate lithium batteries employing the battery polymeric materials according to the present invention. Further, comparative examples will be taken to make it clear that in the lithium batteries of the examples, decrease of the discharge capacity is prevented even when the batteries are exposed to high temperature conditions. It should be appreciated that the battery polymeric materials and the lithium battery according to the present invention are not particularly limited to those in the following examples, and various changes and modifications may be made in the invention without departing from the spirit and scope thereof.

EXAMPLE 1.1

In the example 1.1, a positive electrode and a negative electrode were fabricated in the following manner, and a non-aqueous electrolyte was prepared in the following manner, to fabricate a flat-type and coin-shaped lithium battery as shown in the Figure.

(Fabrication of Positive Electrode)

In fabricating a positive electrode, lithium hydroxide (LiOH), boron oxide ($B_2O_3$), manganese dioxide ($MnO_2$) were mixed so that the atom ratio of Li:B:Mn was 0.53:0.06:1.00. The resultant mixture was heat-treated for twenty hours at the temperature of 375° C. in the atmosphere, and then was reduced to powder, to obtain boron-containing lithium-manganese compound oxide powder used as the positive electrode active material.

Further, the boron-containing lithium-manganese compound oxide powder, carbon black powder as a conductive agent and fluorocarbon resin powder as a binding agent were mixed in the weight ratio of 85:10:5, to obtain a positive agent.

Further, the positive agent thus obtained was formed to be round-shaped by molding and was dried for two hours at the temperature of 250° C. under vacuum, to obtain a positive electrode.

(Fabrication of Negative Electrode)

In fabricating a negative electrode, a lithium-aluminum alloy (Li—Al alloy) was stamped out orbicularly, to obtain a negative electrode.

(Preparation of Non-aqueous Electrolyte)

In preparing a non-aqueous electrolyte, lithium trifluoro-methanesulfonic acid imide [$LiN(CF_3SO_2)_2$] as a solute was dissolved in a mixture solvent obtained by mixing propylene carbonate (PC) and 1.2-dimethoxyethane (DME) in the volume ratio of 1:1 so that the concentration of the above-mentioned solute in the resultant mixture solution was 1 mole/liter, to fabricate a non-aqueous electrolyte.

(Fabrication of Battery)

In fabricating a battery, as shown in the Figure, the above-mentioned positive electrode 1 was mounted on a stainless steel plate (SUS316) as a positive-electrode current collector 5 while the above-mentioned negative electrode 2 was mounted on a stainless steel plate (SUS304) as a negative-electrode current collector 6. Further, a separator 3 comprising a microporous film formed by a polymeric material was impregnated with the above-mentioned non-aqueous electrolyte, and was interposed between the above-mentioned positive electrode 1 and negative electrode 2.

Further, they were contained in a battery case 4 comprising a positive-electrode can 4a and a negative-electrode can 4b, and the positive electrode 1 was connected to the positive-electrode can 4a via the positive-electrode current collector 5 while the negative electrode 2 was connected to the negative-electrode can 4b via the negative-electrode current collector 6, to electrically separate the positive-electrode can 4a and the negative-electrode can 4b from each other by an insulating packing 7 formed by a polymeric material, to obtain a lithium batter having an outer diameter of 24 mm, a thickness of 3 mm, and a battery capacity of 30 mA.

In the Example 1.1, the polymeric material represented by the following chemical formula 1 wherein the (A) group combined with p-phenylene was composed of oxygen (—O—) as shown in the following Table 1, and a melting point thereof was 290° C. was employed as a polymeric material for the above-mentioned separator 3 and the insulating packing 7.

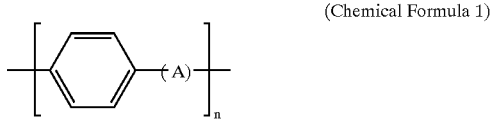

(Chemical Formula 1)

Further, internal residence of the lithium battery was about 10Ω and internal residence of each of the lithium batteries in the following examples and comparative examples was all about 10Ω.

EXAMPLE 1.1a, AND 1.1b

In the examples 1.1a and 1.1b, a lithium battery was fabricated in the same manner as that in the above-mentioned example 1.1 except that only the type of polymeric material for the separator 3 or the insulating packing 7 in the example 1.1 was changed.

In the above-mentioned examples, the polymeric material represented by the foregoing chemical formula 1 was employed for the separator 3 and the insulating packing 7. More specifically, in the example 1.1a, the polymeric material wherein the (A) group combined with p-phenylene was composed of oxygen (—O—) as in the example 1.1 was employed for the insulating packing 7, while the polymeric material wherein the (A) group combined with p-phenylene was composed of sulfur (—S—), and the melting point thereof was 270° C. was employed for the separator 3. On the other hand, in the example 1.1b, the polymeric material wherein the (A) group combined with p-phenylene was composed of oxygen (—O—) as in the example 1.1 was employed for the separator 3, while the polymeric material wherein the (A) group combined with p-phenylene was composed of sulfur (—S—) was employed for the insulating packing 7, as shown in the following Table 1.

Comparative Example 1.1

In the comparative example 1.1, a lithium battery was fabricated in the same manner as that in the above-mentioned example 1.1 except that only the type of polymeric material for the separator 3 and the insulating packing 7 in the example 1.1 was changed.

In the above-mentioned examples, the polymeric material represented by the above-mentioned chemical formula 1 wherein the (A) group combined with p-phenylene was composed of sulfur (—S—), and a melting point thereof was 270° C. was employed for the separator 3 and the insulating packing 7, as shown in the following Table 1.

Increasingly, in each of the lithium batteries thus fabricated in the examples 1.1, 1.1a, 1.1b and in the comparative example 1.1, a battery prior to being heated in a reflowing furnace and a battery after being heated for 10 seconds at the temperature of 250° C. in a reflowing furnace were prepared. Further, each of the two batteries thus prepared was then discharged with a discharge current of 10 mA to a discharge cut-off voltage of 2.0 V. Further, a discharge capacity $Q_o$ prior to being heated in a reflowing furnace and a discharge capacity $Q_a$ after being heated in a reflowing furnace for 10 seconds at the temperature of 250° C. in a reflowing furnace were measured, and the ratio of the discharge capacity $Q_a$ after being heated in a reflowing furnace to the discharge capacity $Q_o$ prior to being heated, $[(Q_a/Q_o) \times 100]$ was found as the percentage of capacity retention. The results were shown in the following Table 1.

TABLE 1

| | (A) | | percentage |
|---|---|---|---|
| | insulating packing | separator | of capacity retention (%) |
| example 1.1 | —O— | —O— | 85 |
| example 1.1a | —O— | —S— | 65 |
| example 1.1b | —S— | —O— | 60 |
| comparative example 1.1 | —S— | —S— | 45 |

As apparent from the result, in each of the lithium batteries in the examples 1.1, 1.1a and 1.1b employing the polymeric material represented by the foregoing chemical formula 1 wherein the (A) group combined with p-phenylene was composed of oxygen (—O—) as a polymeric material for at least either the separator 3 or the insulating packing 7 of the lithium battery, the percentage of the capacity retention after reflowing was increased, compared with the lithium battery in the comparative example 1.1 employing the polymeric material represented by the foregoing chemical formula 1 wherein the (A) group combined with p-phenylene was sulfur (—S—) as a polymeric material for both of the separator 3 and the insulating packing 7 of the battery. In particular, it is to be noted that in the lithium battery in the example 1.1 employing the polymeric material represented by the foregoing chemical formula 1 wherein the (A) group combined with p-phenylene was composed of oxygen (—O—) as a polymeric material for both of the separator 3 and the insulating 7 of the battery, the percentage of the capacity retention after reflowing was further increased.

EXAMPLE 1.2 TO 1.9

In the examples 1.2 to 1.9, each of the lithium batteries was fabricated in the same manner as that in the above-mentioned example 1.1 except that only the type of polymeric material for the separator 3 and the insulating packing 7 in the example 1.1 was changed.

In the example 1.2 to 1.9, the polymeric materials represented by the foregoing chemical formula 1 were employed for the separator 3 and the insulating packing 7. More specifically, in the example 1.2, the polymeric material wherein the (A) group combined with p-phenylene was composed of a methylene group (—$CH_2$—), and a melting point thereof was 400° C. was employed, in the example 1.3, the polymeric material wherein the above-mentioned (A) group was composed of an isopropylidene group [—$C(CH_3)_2$—], and a melting point thereof was 300° C., in the example 1.4, the polymeric material wherein the above-mentioned (A) group was composed of a carbonyl group (—CO—), and a melting point thereof was 380° C., in the example 1.5, the polymeric material wherein the above-mentioned (A) group was composed of a carbonyldioxy group (—OCOO—), and a melting point thereof was 250° C., in the example 1.6, the polymeric material wherein the above-mentioned (A) group was composed of a carboxylic acid anhydride group (—COOCO—), and a melting point thereof was 400° C., in the example 1.7, the polymeric material wherein the above-mentioned (A) group was composed of an amide group (—CONH—), and a melting point thereof was 500° C., in the example 1.8, the polymeric material wherein the above-mentioned (A) group was composed of an ureylene group (—NHCONH—), and a melting point thereof was 250° C., and in the example 1.9, the polymeric material wherein the above-mentioned (A) was composed of a sulfonyl group (—SO$_2$—), and a melting point thereof was 400° C.

Comparative Example 1.2 to 1.4

In the comparative examples 1.2 to 1.4, each of the lithium batteries was fabricated in the same manner as that in the above-mentioned example 1.1 except that only the type of polymeric material for the separator 3 and the insulating packing 7 in the example 1.1 was changed.

In the example 1.2 to 1.4, the polymeric materials represented by the chemical formula 1 were employed for the separator and the insulating packing 7. More specifically, in the comparative example 1.2, the polymeric material wherein the (A) group combined with p-phenylene was not present, which is formed by a polymer comprising p-phenylene combined with each other, and a melting point thereof was 450° C. was employed for the separator 3 and the insulating packing 7, in the comparative example 1.3, a polymeric material wherein the (A) group was composed of a tetramethylethylene group [—C(CH$_3$)$_2$C(CH$_3$)$_2$—], and a melting point thereof was 300° C., and in the comparative example 1.4, a polymeric material wherein the (A) group was composed of an ethylene group (—C$_2$H$_4$—), and a melting point thereof was 425° C., as shown in the Table 2.

In each of lithium batteries thus fabricated in the examples 1.2 to 1.9 and the comparative examples 1.2 to 1.4, a discharge capacity Qo prior to being heated in a reflowing furnace and a discharge capacity Qa after being heated in a reflowing furnace for 10 seconds at the temperature of 250° C. were measured in the same manner as that in the example 1.1 an the comparative example 1.1. Further, [(Qa/Qo)×100] was found as the percentage of capacity retention. The results were shown in the following Table 2 together with the results of the example 1.1 and the comparative example 1.1.

TABLE 2

$$\left[ \phantom{x} \underset{\displaystyle \bigcirc}{} (A) \phantom{x} \right]_n$$

| | (A) | percentage of capacity retention (%) |
|---|---|---|
| example 1.1 | —O— | 85 |
| example 1.2 | —CH$_2$— | 80 |
| example 1.3 | —C(CH$_3$)$_2$— | 65 |
| example 1.4 | —C(=O)— | 85 |
| example 1.5 | —O—C(=O)—O— | 64 |
| example 1.6 | —C(=O)—O—C(=O)— | 62 |
| example 1.7 | —C(=O)—NH— | 51 |
| example 1.8 | —HN—C(=O)—NH— | 50 |
| example 1.9 | —S(=O)$_2$— | 58 |
| comparative example 1.1 | —S— | 45 |
| comparative example 1.2 | — | 38 |
| comparative example 1.3 | —C(CH$_3$)$_2$—C(CH$_3$)$_2$— | 42 |
| comparative example 1.4 | —CH$_2$—CH$_2$— | 40 |

As apparent from the result, in each of the lithium batteries in the examples 1.1 to 1.9 employing for the separator 3 and the insulating packing 7 the polymeric materials represented by the foregoing chemical formula wherein the (A) group combined with p-phenylene was composed of one type of group selected from the group of oxygen, a methylene group, an isopropylidene group, a carbonyl group, a carbonyldioxy group, a carboxylic acid anhydride group, an amide group, an ureylene group, the percentage of capacity retention after reflowing was increased, compared with each of the lithium batteries in the comparative examples 1.1 to 1.4 employing for the separator 3 and the insulating packing 7 the polymeric material represented by the foregoing chemical formula 1 wherein the (A) group combined with p-phenylene was composed of a group other than the above-mentioned groups or the (A) group was not combined.

Further, when each of the lithium batteries in the examples 1.1 to 1.9 was compared with each other, in the lithium batteries in the examples 1.1 and 1.4 employing for the separator 3 and the insulating packing 7 the polymeric material wherein the above-mentioned (A) group combined with p-phenylene was composed of oxygen or a carbonyl group, the percentage of the capacity retention after reflowing was further increased.

EXAMPLE 2.1 TO 2.8

In the examples 2.1 to 2.8, each of the lithium batteries was fabricated in the same manner as that in the above-mentioned example 1.1 except that only the type of polymeric material for the separator 3 and the insulating packing 7 in the example 1.1 was changed.

In the above-mentioned examples, the polymeric material comprising repeating units wherein p-phenylene combined with the (A) group and p-phenylene combined with the (B) group were combined with each other, as shown in the following Table 2, was employed as the polymeric materials for the separator 3 and the insulating packing 7.

(Chemical Formula 2)

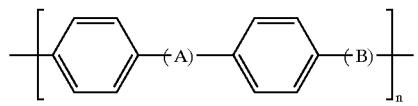

Further, in the example 2.1, the polymeric material wherein the (A) group was composed of oxygen (—O—) and the (B) group was composed of a carbonyl group (—CO—), and a melting point thereof was 360° C. was employed, in the example 2.2, the polymeric material wherein the (A) group was composed of an isopropylidene group [—C(CH₃)₂—] and the (B) group was composed of a carbonyldioxy group (—OCOO—), and the melting point thereof was 270° C., in the example 2.3, the polymeric material wherein the (A) group was composed of an isopropylidene group [—C(CH₃)₂—] and the (B) group was composed of a carboxylic acid anhydride group (—COOCO—), and a melting point thereof was 332° C., in the example 2.4, the polymeric material wherein the (A) group was composed of oxygen (—O—) and the (B) group was composed of a carboxylic acid anhydride group (—COOCO—), and a melting point thereof was 290° C., in the example 2.5, the polymeric material wherein the (A) group was composed of a methylene group (—CH₂—) and the (B) group was composed of an ureylene group (—NHCONH—), and a melting point thereof was 300° C., in the example 2.6, the polymeric material wherein the (A) group was composed of a carbonyl group (—CO—) and the (B) group was composed of sulfur (—S—), and a melting point thereof was 334° C., in the example 2.7, the polymeric material wherein the (A) group was composed of a sulfonyl group (—SO₂—) and the (B) group was composed of sulfur (—S—), and a melting point thereof was 400° C., and in the example 2.8, the polymeric material wherein the (A) group was composed of oxygen (—O—) and the (B) group was composed of a sulfonyl group (—SO₂—), and a melting point thereof was 250° C., as shown in the Table 3.

Comparative Example 2.1 and 2.2

In the comparative examples 2.1 and 2.2, each of the lithium batteries was fabricated in the same manner as that in the above-mentioned example 1.1 except that only the type of polymeric material for the separator 3 and the insulating packing 7 in the example 1.1 was changed.

In the above-mentioned examples, the polymeric material represented by the above-mentioned chemical formula 2 was employed for the separator 3 and the insulating packing 7. More specifically, in the example 2.1, the polymeric material wherein the (A) group was composed of an ethylene group (—C₂H₄—) and the (B) group was composed of a carbonyldioxy group (—OCOO—), and the melting point thereof was 290° C. was employed, and in the example 2.2, the polymeric material wherein the (A) group was not present and the (B) group was composed of sulfur (—S—), and a melting point thereof was 430° C., as shown in the following Table 3.

In each of the lithium batteries thus fabricated in the examples 2.1 to 2.8 and the comparative examples 2.1 and 2.2, a discharge capacity Qo prior to being heated in a reflowing furnace and a discharge capacity Qa after being heated in a reflowing furnace for 10 seconds at the temperature of 250° C. were measured in the same manner as that in the above-mentioned example 1.1 and the comparative example 1.1. Further, [(Qa/Qo)×100] was found as the percentage of capacity retention. The results were shown in the following Table 3.

TABLE 3

$$\left[\phantom{X}\!\!\!\bigcirc\!\!-(A)-\!\!\bigcirc\!\!-(B)\!\!\right]_n$$

| | (A) | (B) | percentage of capacity retention (%) |
|---|---|---|---|
| example 2.1 | —O— | —C(=O)— | 97 |
| example 2.2 | —C(CH₃)₂— | —O—C(=O)—O— | 75 |
| example 2.3 | —C(CH₃)₂— | —C(=O)—O—C(=O)— | 72 |
| example 2.4 | —O— | —C(=O)—O—C(=O)— | 70 |

TABLE 3-continued

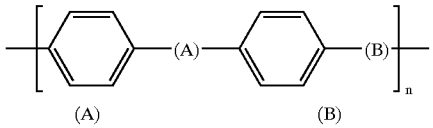

| | (A) | (B) | percentage of capacity retention (%) |
|---|---|---|---|
| example 2.5 | —$CH_2$— | —HN—C(=O)—NH— | 68 |
| example 2.6 | —C(=O)— | —S— | 65 |
| example 2.7 | —S(=O)(=O)— | —S— | 62 |
| example 2.8 | —O— | —S(=O)(=O)— | 60 |
| comparative example 2.1 | —$CH_2$—$CH_2$— | —O—C(=O)—O— | 38 |
| comparative example 2.2 | — | —S— | 30 |

EXAMPLES 3.1 TO 3.4

In the comparative examples 3.1 to 3.4, each of the lithium batteries was fabricated in the same manner as that in the above-mentioned example 1.1 except that only the type of polymeric material for the separator 3 and the insulating packing 7 in the example 1.1 was changed.

In the above-mentioned examples, the polymeric material comprising repeating units wherein p-phenylene combined with the (A) group, p-phenylene combined with the (B) group, and p-phenylene combined with the (C) group were combined with each other, as shown in the following chemical formula 3, was employed as a polymeric material for the separator 3 and the insulating packing 7.

(Chemical Formula 3)

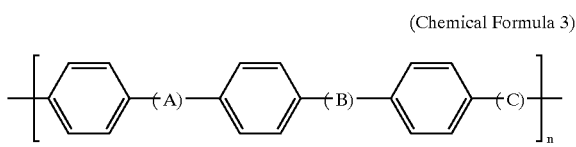

Further, in the example 3.1, the polymeric material wherein the (A) group was composed of oxygen (—O—), the (B) group was composed of oxygen (—O—), and the (C) group was composed of a carbonyl group (—CO—), and a melting point thereof was 334° C. was employed, in the example 3.2, the polymeric material wherein the (A) group was composed of a carbonyl group (—CO—), the (B) group was composed of oxygen (—O—), and the (C) group was composed of a carbonyl group (—CO—), and a melting point thereof was 338° C., in the example 3.3, the polymeric material wherein the (A) group was composed of a carbonyloxy group (—COO—), the (B) group was composed of an isopropylidene group [—C(CH$_3$)$_2$—], and the (C) group was composed of a carbonyloxy group (—OCO—), and a melting point thereof was 250° C., in the example 3.4, the polymeric material wherein the (A) group was composed of an amide group (—CONH—), the (B) group was composed of a methylene group (—CH$_2$—), and the (C) group was composed of an amide group (—CONH—), and a melting point thereof was 420° C., as shown in the following Table 4.

Comparative Example 3.1 and 3.2

In the comparative examples 3.1 and 3.2, each of the lithium batteries was fabricated in the same manner as that in the above-mentioned example 1.1 except that only the type of polymeric material for the separator 3 and the insulating packing 7 in the example 1.1 was changed.

In the above-mentioned examples, the polymeric material represented by the foregoing chemical formula 3 was employed for the separator 3 and the insulating packing 7. More specifically, in the comparative example 3.1, the polymeric material wherein the (A) group was composed of a carbonyloxy group (—COO—), the (B) group was not present, and the (C) group was composed of a carbonyloxy group (—OCO—), and a melting point thereof was 421° C. was employed, and in the comparative example 3.2, the polymeric material wherein the (A) group was composed of an amide group (—CONH—), the (B) group was not present, and the (C) group was composed of an amide group (—CONH—), and the melting point thereof was 500° C. Increasingly, in each of the lithium batteries thus fabricated in the examples 3.1 to 3.4 and the comparative examples 3.1 and 3.2, a discharge capacity Qo prior to being heated in a reflowing furnace and a discharge capacity Qa after being heated in a reflowing furnace for 10 seconds at the temperature of 250° C. were measured in the same manner as that in the above-mentioned example 1.1 and the comparative example 1.1. Further, [(Qa/Qo)×100] was found as the percentage of capacity retention. The results were shown in the following Table 4.

TABLE 4 structure: —[—⟨phenylene⟩—(A)—⟨phenylene⟩—(B)—⟨phenylene⟩—(C)—]$_n$—

| | (A) | (B) | (C) | percentage of capacity retention (%) |
|---|---|---|---|---|
| example 3.1 | —O— | —O— | —C(=O)— | 95 |
| example 3.2 | —C(=O)— | —O— | —C(=O)— | 90 |
| example 3.3 | —C(=O)—O— | —C(CH$_3$)$_2$— | —O—C(=O)— | 50 |
| example 3.4 | —C(=O)—NH— | —CH$_2$— | —C(=O)—NH— | 54 |
| comparative example 3.1 | —C(=O)—O— | — | —O—C(=O)— | 39 |
| comparative example 3.2 | —C(=O)—NH— | — | —C(=O)—NH— | 42 |

Comparative Example 4.1 and 4.2

In the comparative examples 4.1 and 4.2, each of the lithium batteries was fabricated in the same manner as that in the above-mentioned example 1.1 except that only the type of polymeric material for the separator 3 and the insulating packing 7 in the example 1.1 was changed.

In the above-mentioned examples, a polymeric material comprising repeating units wherein p-phenylene combined with the (A) group, p-phenylene combined with the (B) group, and p-phenylene combined with the (C) group, and p-phenylene combined with the (D) group were combined with each other, as shown in the following chemical formula 4 was employed as the polymeric material for the separator 3 and the insulating packing 7.

Further, in the example 4.1, the polymeric material wherein the (A) group was composed of oxygen (—O—), the (B) group was composed of oxygen (—O—), the (C) group was composed of a carbonyl group (—CO—), and the (D) group was composed of a carbonyl group (—CO—), and a melting point thereof was 375° C. was employed, and in the example 4.2, the polymeric material wherein the (A) group was composed of oxygen (—O—), the (B) group was composed of an isopropylidene group [—C(CH$_3$)$_2$—], the (C) group was composed of oxygen (—O—) and the (D) group was composed of a sulfonyl group (—SO$_2$—), and a melting point thereof was 250° C., as shown in the following Table 5.

Comparative Example 4.1

In the comparative example 4.1, a lithium battery was fabricated in the same manner as that in the above-mentioned example 1.1 except that only the type of polymeric material for the separator 3 or the insulating packing 7 in the example 1.1 was changed.

In the above-mentioned example, the polymeric material represented by the foregoing chemical formula 4 wherein the (A) group was composed of oxygen (—O—), the (B) group was not present, the (C) group was composed of oxygen (—O—), and the (D) group was composed of a carbonyl group (—CO—), and a melting point thereof was 386° C. was employed for the separator 3 and the insulating packing 7, as shown in the following Table 5.

In each of the lithium batteries thus fabricated as described above in the examples 4.1, 4.2 and the comparative example 4.1, a discharge capacity Qo prior to being heated in a reflowing furnace and a discharge capacity Qa after being heated in a reflowing furnace for 10 seconds at the temperature of 250° C. were measured in the same

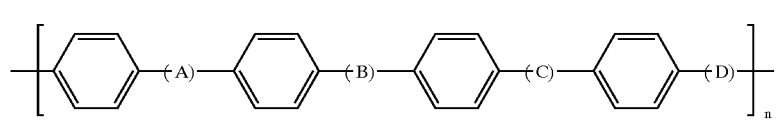

(Chemical Formula 4)

manner as that in the above-mentioned example 1.1 and the comparative example 1.1. Further, [(Qa/Qo)×100] was found as the percentage of capacity retention. The results were shown in the following Table 5.

TABLE 5

$$\left[ \phantom{xx} (A) \phantom{xx} (B) \phantom{xx} (C) \phantom{xx} (D) \phantom{xx} \right]_n$$

(structure: five p-phenylene rings connected by linking groups A, B, C, D)

| | (A) | (B) | (C) | (D) | percentage of capacity retention (%) |
|---|---|---|---|---|---|
| example 4.1 | —O— | —O— | —C(=O)— | —C(=O)— | 96 |
| example 4.2 | —O— | —C(CH$_3$)(CH$_3$)— | —O— | —S(=O)(=O)— | 65 |
| comparative example 4.1 | —O— | — | —O— | —C(=O)— | 41 |

Comparative Example 5.1

In the comparative example 5.1, a lithium battery was fabricated in the same manner as that in the above-mentioned example 1.1 except that only the type of polymeric material for the separator 3 or the insulating packing 7 in the example 1.1 was changed.

In the example 5.1, the polymeric material comprising repeating units wherein p-phenylene combined with the (A) group, p-phenylene combined with the (B) group, p-phenylene combined with the (C) group, p-phenylene combined with the (D) group, and p-phenylene combined with the (E) group were combined with each other, as shown in the chemical formula 5, and the (A) group was composed of a carbonyl group (—CO—), the (B) group was composed of oxygen (—O—), the (C) group was composed of a carbonyl group (—CO—), the (D) group was composed of oxygen, and the (E) group was composed of a carbonyl group (—CO—), and the melting point thereof was 380° C., as shown in the following table 6.

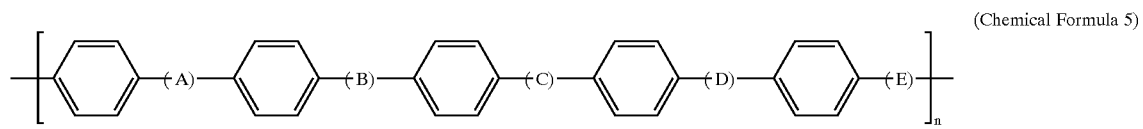

(Chemical Formula 5)

In the lithium battery thus fabricated in the examples 5.1, a discharge capacity Qo prior to being heated in a ref lowing furnace and a discharge capacity Qa after being heated in a reflowing furnace for 10 seconds at the temperature of 250° C. were measured in the same manner as that in the example 1.1 and the comparative example 1.1. Further, [(Qa/Qo)× 100] was found as the percentage of capacity retention. The results were shown in the following Table 6.

TABLE 6

$$-\left[\phantom{O}\right.\!\!\!\!\bigcirc\!\!\!\!-(A)-\!\!\!\!\bigcirc\!\!\!\!-(B)-\!\!\!\!\bigcirc\!\!\!\!-(C)-\!\!\!\!\bigcirc\!\!\!\!-(D)-\!\!\!\!\bigcirc\!\!\!\!-(E)\left.\phantom{O}\right]_n$$

| | (A) | (B) | (C) | (D) | (E) | percentage of capacity retention (%) |
|---|---|---|---|---|---|---|
| example 5.1 | —CO— | —O— | —CO— | —O— | —CO— | 98 |

As apparent from the results of the above-mentioned Tables 3 to 6, in each of the lithium batteries in the examples 2.1 to 2.8, 3.1 to 3.4, 4.1, 4.2, and 5.1 employing for the separator 3 and the insulating packing 7 the polymeric materials wherein each of the (A) to the (E) groups was composed of one type of group selected from the group composed of oxygen, a methylene group, an isopropylidene group, a carbonyl group, a carbonyldioxy group, a carboxylic acid anhydride gourp, an amide group, an ureylene group, a sulfonyl group, sulfur and a carbonyloxy group, the percentage of the capacity retention after reflowing was increased, compared with each of the lithium batteries in the comparative example 2.1, 2.2 3.1, 3.2 and 4.1 employing for the separator 3 and the insulating packing 7 the polymeric material wherein either of groups combined with p-phenylene was a group other than the above-mentioned groups or was not combined.

Further, when each of the lithium batteries in the above-mentioned examples was compared with each other, in each of the lithium batteries in the examples 2.1, 3.1, 3.2, 4.1 and 5.1 employing for the separator 3 and the insulating packing 7 the polymeric material wherein each of the (A) to (E) groups combined with p-phenylene was composed of oxygen and a carbonyl group, the percentage of the capacity retention after reflowing was further increased.

EXAMPLES 6.1 TO 6.5

In the above-mentioned examples, a lithium battery was fabricated in the same manner as that in the above-mentioned example 1.1 except that only the type of polymeric material for the separator 3 and the insulating packing 7 in the example 1.1 was changed into the polymeric material represented by the foregoing chemical formula 3 wherein the (A) group was composed of oxygen (—O—), the (B) group was composed of oxygen (—O—), and the (C) group was composed of a carbonyl group (—CO—), and the melting point thereof was 334° C., as the case of the example 3.1, and that the type of solute to be used in the non-aqueous electrolyte was changed as shown in the following Table 7.

In the examples 6.1 to 6.5, hexafluorophosphoric acid lithium (LiPF$_6$) was employed as a solute to be used in the non-aqueous electrolyte in the example 6.1, tetrafluoroboric acid lithium (LiBF$_4$) in the example 6.2, trifluoromethanesulfonic acid lithium (LiCF$_3$SO$_3$) in the example 6.3, lithium pentafluoro-ethanesulfonic acid imide [LiN(C$_2$F$_5$SO$_2$)$_2$] in the example 6.4, and lithium trifluoromethanesulfonic acid methide [LiC(CF$_3$SO$_2$)$_3$] in the example 6.5, as shown in the Table 7.

In each of the lithium batteries thus fabricated in the examples 6.1 to 6.5, a discharge capacity Qo prior to being heated in a reflowing furnace and a discharge capacity Qa after being heated in a reflowing furnace for 10 seconds at the temperature of 250° C. were measured in the same manner as in the above-mentioned example 1.1 and the comparative example 1.1. Further, [(Qa/Qo)×100] was found as the percentage of capacity retention. The results were shown in the following Table 7 together with the result of the above-mentioned comparative example 3.1.

TABLE 7

| | solute of non-aqueous electrolyte | percentage of capacity retention (%) |
|---|---|---|
| example 3.1 | LiN(CF$_3$SO$_2$)$_2$ | 95 |
| example 6.1 | LiPF$_6$ | 92 |
| example 6.2 | LiBF$_4$ | 90 |
| example 6.3 | LiCF$_3$SO$_3$ | 92 |
| example 6.4 | LiN(C$_2$F$_5$SO$_2$)$_2$ | 94 |
| example 6.5 | LiC(CF$_3$SO$_2$)$_3$ | 91 |

As apparent from the result, in each of the lithium batteries in the examples 3.1, 6.1 to 6.5 employing for the separator 3 and the insulating packing 7 the polymeric material represented by the foregoing chemical formula 3 wherein the (A) group was composed of oxygen (—O—), the (B) group was composed of oxygen (—O—), and the (C) group was composed of a carbonyl group (—CO—), the percentage of capacity retention after reflowing was as high as more than 90% even when a solute of the non-aqueous electrolyte was changed as described above.

EXAMPLE 7.1 TO 7.12

In the example 7.1 to 7.12, a lithium battery was fabricated in the same manner as that in the above-mentioned example 1.1 except that only the type of polymeric material for the separator 3 and the insulating packing 7 in the example 1.1 was changed into the polymeric material represented by the chemical formula 3 wherein the (A) group was composed of oxygen (—O—), the (B) group was composed of oxygen (—O—), and the (C) group was composed of a carbonyl group (—CO—), and the melting point thereof was 334° C., as the case of the examples 3.1, and that the type of solvent to be used in the non-aqueous electrolyte was changed as shown in the following Table 8.

In the examples 7.1 to 7.12, a mixture solvent of ethylene carbonate (EC) and 1.2-dimethoxyethane (DME) in the volume ratio of 1:1 was used as a solute to be used in an aqueous electrolyte in the example 7.1, a mixture solvent of 1.2-buthylene carbonate (BC) and 1.2-dimethoxyethane (DME) in the volume ratio of 1:1 in the example 7.2, a mixture solvent of vinylene carbonate (VC) and 1.2-dimethoxyethane (DME) in the volume ratio of 1:1 in the example 7.3, a mixture solvent of γ-butyrolactone (γ-BL) and 1.2-dimethoxyethane (DME) in the volume ratio of 1:1 in the example 7.4, a mixture solvent of sulfolane (SL) and 1.2-dimethoxyethane (DME) in the volume ratio of 1:1 in the example 7.5, a mixture solvent of propylene carbonate (PC) and 1.2-diethoxyethane (DEE) in the volume ratio of 1:1 in the example 7.6, a mixture solvent of propylene carbonate (PC) and 1.2-etoxymethoxyethane (EME) in the volume ratio of 1:1 in the example 7.7, a mixture solvent of propylene carbonate (PC) and tetrahydrofuran (THF) in the volume ratio of 1:1 in the example 7.8, a mixture solvent of propylene carbonate (PC) and 1.3-dioxolane (DOXL) in the volume ratio of 1:1 in the example 7.9, a mixture solvent of propylene carbonate (PC) and dimethyl carbonate (DMC) in the volume ratio of 1:1 in the example 7.10, a mixture solvent of propylene carbonate (PC) and diethyl carbonate (DEC) in the volume ratio of 1:1 in the example 7.11, and a mixture solvent of propylene carbonate (PC) and ethyl methyl carbonate (EMC) in the volume ratio of 1:1 in the example 7.12, as shown in the Table 8.

In each of the lithium batteries thus fabricated in the examples 7.1 to 7.12, a discharge capacity Qo prior to being heated in a reflowing furnace and a discharge capacity Qa after being heated in a reflowing furnace for 10 seconds at the temperature of 250° C. were measured. Further, the ratio of the discharge capacity Qa to the discharge capacity Qo, [(Qa/Qo)×100] was found as the percentage of capacity retention. The results were shown in the following Table 8 together with the result of the example 3.1.

TABLE 8

|  | solvent of non-aqueous electrolyte (volume ratio) | percentage of capacity retention (%) |
|---|---|---|
| example 3.1 | PC:DME (1:1) | 95 |
| example 7.1 | EC:DME (1:1) | 93 |
| example 7.2 | BC:DME (1:1) | 94 |
| example 7.3 | VC:DME (1:1) | 93 |
| example 7.4 | γ-BL:DME (1:1) | 90 |
| example 7.5 | SL:DME (1:1) | 94 |
| example 7.6 | PC:DEE (1:1) | 94 |
| example 7.7 | PC:EME (1:1) | 92 |
| example 7.8 | PC:THF (1:1) | 91 |
| example 7.9 | PC:DOXL (1:1) | 91 |
| example 7.10 | PC:DMC (1:1) | 93 |

TABLE 8-continued

|  | solvent of non-aqueous electrolyte (volume ratio) | percentage of capacity retention (%) |
|---|---|---|
| example 7.11 | PC:DEC (1:1) | 94 |
| example 7.12 | PC:EMC (1:1) | 91 |

As apparent from the result, in each of the lithium batteries in the examples 3.1, and 7.1 to 7.12 employing for the separator 3 and the insulating packing 7 the polymeric material represented by the foregoing chemical formula 3 wherein the (A) group was composed of oxygen (—O—), the (B) group was composed of oxygen (—O—), and the (C) group was composed of a carbonyl group (—CO—), the percentage of capacity retention after reflowing was as high as more than 90% even when a solute to be used in the non-aqueous electrolyte was changed as described above.

Although the present invention has been fully described by way of examples, it is to be noted that various changes and modification will be apparent to those skilled in the art.

Therefore, unless otherwise such changes and modifications depart from the scope of the present invention, they should be construed as being included therein.

What is claimed is:

1. A battery polymeric material composed of single type of repeating unit, wherein said repeating unit has the formula

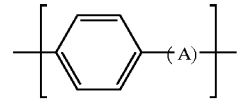

where A is selected from the group consisting of oxygen, a methylene group, an isopropylidene group, a carbonyl group, a carbonyldioxy group, a carboxylic acid anhydride group, an ureylene group, and a sulfonyl group.

2. A battery polymeric material according to claim 1, wherein A is oxygen or a carbonyl group.

* * * * *